United States Patent [19]
Harfmann

[11] Patent Number: 5,985,190
[45] Date of Patent: Nov. 16, 1999

[54] METHOD AND SYSTEM FOR FORMING LOW-DENSITY POLYMER FOAM ARTICLE

[75] Inventor: Walter R. Harfmann, Matthews, N.C.

[73] Assignee: Genpak, L.L.C., Glens Falls, N.Y.

[21] Appl. No.: 09/067,727

[22] Filed: Apr. 28, 1998

[51] Int. Cl.[6] .................................................. B29C 44/20
[52] U.S. Cl. ............................... 264/53; 264/48; 264/55; 264/321
[58] Field of Search .............................. 264/55, 53, 321, 264/177.17, 48

[56] References Cited

U.S. PATENT DOCUMENTS

| | | | |
|---|---|---|---|
| 3,277,221 | 10/1966 | Parrish | 264/53 |
| 3,584,090 | 6/1971 | Parrish | 264/45 |
| 3,637,458 | 1/1972 | Parrish | 161/160 |
| 4,043,950 | 8/1977 | Wilmsen et al. | 260/2.5 F |
| 4,122,047 | 10/1978 | Filip et al. | 521/106 |
| 4,163,037 | 7/1979 | Niznik | 264/54 |
| 4,444,832 | 4/1984 | Mazzola et al. | 428/290 |
| 4,462,947 | 7/1984 | Huggard | 264/54 |
| 4,466,933 | 8/1984 | Huggard | 264/54 |
| 4,833,174 | 5/1989 | Tung | 521/81 |
| 4,981,631 | 1/1991 | Cheung et al. | 264/50 |
| 5,000,991 | 3/1991 | Hayashi et al. | 428/36.5 |
| 5,110,844 | 5/1992 | Hayashi et al. | 521/182 |
| 5,128,202 | 7/1992 | Subramanian et al. | 428/318.6 |
| 5,128,383 | 7/1992 | Amano et al. | 521/182 |
| 5,223,545 | 6/1993 | Kumar | 521/51 |
| 5,229,432 | 7/1993 | Muschiatti | 521/182 |
| 5,234,640 | 8/1993 | Amano et al. | 264/55 |
| 5,246,976 | 9/1993 | Pontiff | 521/143 |
| 5,254,400 | 10/1993 | Bonner, Jr. et al. | 428/305.5 |
| 5,314,925 | 5/1994 | Burnell et al. | 521/92 |
| 5,340,846 | 8/1994 | Rotter et al. | 521/182 |
| 5,360,829 | 11/1994 | Kawabe et al. | 521/81 |
| 5,362,763 | 11/1994 | Al Ghatta et al. | 521/79 |
| 5,389,319 | 2/1995 | Hayashi et al. | 264/53 |
| 5,391,582 | 2/1995 | Muschiatti et al. | 521/81 |
| 5,399,595 | 3/1995 | Sublett et al. | 521/182 |
| 5,405,563 | 4/1995 | Hayashi et al. | 264/55 |
| 5,422,381 | 6/1995 | Al Ghatta et al. | 521/182 |
| 5,458,832 | 10/1995 | Kabumoto et al. | 264/53 |
| 5,534,215 | 7/1996 | Song et al. | 264/177.17 |
| 5,545,364 | 8/1996 | Song et al. | 264/177.17 |
| 5,679,295 | 10/1997 | Harfmann | 264/50 |
| 5,681,865 | 10/1997 | Harfmann | 521/79 |
| 5,695,709 | 12/1997 | Van Erden et al. | 264/177.17 |

FOREIGN PATENT DOCUMENTS

| | | | |
|---|---|---|---|
| 0 390 723 | 10/1990 | European Pat. Off. | B29C 47/10 |
| 51-75116 | 6/1976 | Japan | 264/53 |
| 51-102067 | 9/1976 | Japan | 264/53 |
| WO 90/07407 | 7/1990 | WIPO . | |

Primary Examiner—Allan R. Kuhns
Attorney, Agent, or Firm—Heslin & Rothenberg, P.C.; Wayne F. Reinke, Esq.

[57] ABSTRACT

A crystalline polymer resin, such as poly(ethylene terephthalate), is heated to melting. One or more blowing agents is selected wherein at least one of the blowing agents has a boiling point greater than the glass transition temperature for the resin and less than the forming temperature, such as the temperature of the mold used to form the useful article. The blowing agent(s) and resin are combined to create a mixture with a blowing agent concentration sufficient to produce a theoretical sheet foam density of less than 0.4 g/cm$^3$. The mixture is cooled to a temperature approaching the freezing point of the mixture, and then extruded into a substantially uniform closed cell polymer foam sheet of density less than 0.4 g/cm$^3$. The extruded sheet is then cooled by direct contact with a cooling surface at a surface temperature below the glass transition temperature such that the blowing agent(s) condenses and the sheet has a density of greater than 0.4 g/cm$^3$ and a sheet crystallinity of less than 15%. An article is then formed from the cooled sheet by applying heat such that the condensed blowing agent(s) vaporizes and the article crystallizes at a density of less than 0.4 g/cm$^3$ with a crystallinity of greater than 20%.

18 Claims, 6 Drawing Sheets fig. 1 fig. 2 fig. 3 fig. 4 fig. 5 fig. 6 fig. 7

METHOD AND SYSTEM FOR FORMING LOW-DENSITY POLYMER FOAM ARTICLE

BACKGROUND OF THE INVENTION

1. Technical Field

The present invention generally relates to a method and system for producing polymer foam articles. More particularly, the present invention relates to a method and system for producing low-density, high melting point polymer foam articles.

2. Background Information

For some time, low-density polystyrene foam (also referred to as "atactic" polystyrene foam) has been found useful in insulation, packaging, beverage cups and food containers. However, low-density polystyrene products generally have a service temperature limit of about 200° F. Above the service temperature limit, the product will warp and distort. Therefore, there is a general desire for other types of low-density foam that do not suffer such shortcomings.

Polymer resins, such as, for example, poly(ethylene terephthalate) (often referred to as "PET"), polyamides (such as Nylon 6,6), and syndiotactic polystyrene, exist that could be used without suffering such shortcomings. These materials are currently available in the form of solid products, however their high raw material cost renders them useless in many applications for economic reasons. For example, PET is currently widely used to make many recyclable plastic items, such as soda bottles. However, attempts to produce low-density foam articles from polymers with "high" melting points (i.e., greater than 450° F.) has proven to be difficult, and the quality of such foam has been poor. Foam articles made from such polymers have experienced foam cell collapse and/or severe imperfections. Thus, the quality of the low-density, high melting point polymer foam articles has not been close to polystyrene. The problem of collapsing is due to the high foaming temperature such materials demand, for example, PET foams at about 480° F. Using conventional blowing agents at such temperatures results in a high rate of expansion, causing cell wall rupture and allowing the gas to escape. Without gas in the foam cells prior to cooling, the cells cannot support themselves. In addition, many such polymer resins are crystalline in nature, and as such, have an inferior melt strength compared to atactic polystyrene resins. As one skilled in the art will know, melt strength refers to the ability of a material to be stretched at its melting temperature without breaking. The combination of a lower melt strength polymers and higher vapor pressure at the elevated foaming temperature also requires a reduction in the size of the extrusion die opening where the foam exits. Such small die openings lead to a thin gauge foam sheet experiencing severe corrugation at low densities. Corrugation is defines as alternating bands of thicker and thinner sheet in the cross-machine dimension of the sheet. Corrugation is detrimental to the formed product due to thin gauge areas in that product and irregular part weight.

Thus, a need exists for a way to make a quality low-density, high service temperature polymer foam article approaching or achieving the quality of existing polystyrene foam articles.

SUMMARY OF THE INVENTION

Briefly, the present invention satisfies the need for a way to make a quality low-density polymer foam article by extruding a low-density polymer foam sheet, increasing the density of the foam sheet by direct contact cooling, and forming an article by, in part, applying heat to reduce the density of the foam such that the formed article is low-density.

In accordance with the above, it is an object of the present invention to provide a way to make a polymer foam article.

It is another object of the present invention to provide a way to make a low-density, high service temperature polymer foam article.

The present invention provides, in a first aspect, a method of forming a substantially uniform closed cell crystalline polymer foam article. The method comprises steps of: heating a crystalline polymer resin to a melt temperature such that the resin melts; selecting one or more blowing agents, at least one of the one or more blowing agents having a boiling point greater than the glass transition temperature of the polymer but less than or equal to the forming temperature; combining the one or more blowing agents with the resin to create a mixture such that a concentration of the one or more blowing agents in the mixture is sufficient to produce a theoretical sheet foam density of less than 0.4 g/cm$^3$; cooling the mixture to a temperature approaching a freezing temperature for the mixture; extruding a substantially uniform closed cell polymer foam sheet of density less than 0.4 g/cm$^3$ from the cooled mixture; cooling the extruded polymer foam sheet by direct contact with a cooling surface at a surface temperature below the glass transition temperature such that the one or more blowing agents condense and the polymer foam sheet has a density of greater than 0.4 g/cm$^3$; and forming the cooled polymer foam sheet into an article, comprising applying heat such that the condensed one or more blowing agents vaporize and the article crystallizes at a density of less than 0.4 g/cm$^3$.

The present invention also comprises, in a second aspect, a system for performing the method of the first aspect.

These, and other objects, features and advantages of this invention will become apparent from the following detailed description of the various aspects of the invention taken in conjunction with the accompanying drawings.

BEST MODE FOR CARRYING OUT THE INVENTION

The present invention provides a method for producing a low-density, substantially uniform closed cell polymer foam article from a medium density polymer foam sheet. The term "low-density" used in this context refers to a polymer foam of a density less than about 0.40 g/cm$^3$. The term "medium-density" used in this context refers to a polymer foam of a density less than about 0.8 g/cm$^3$ but greater than about 0.4 g/cm$^3$.

Figure 5:
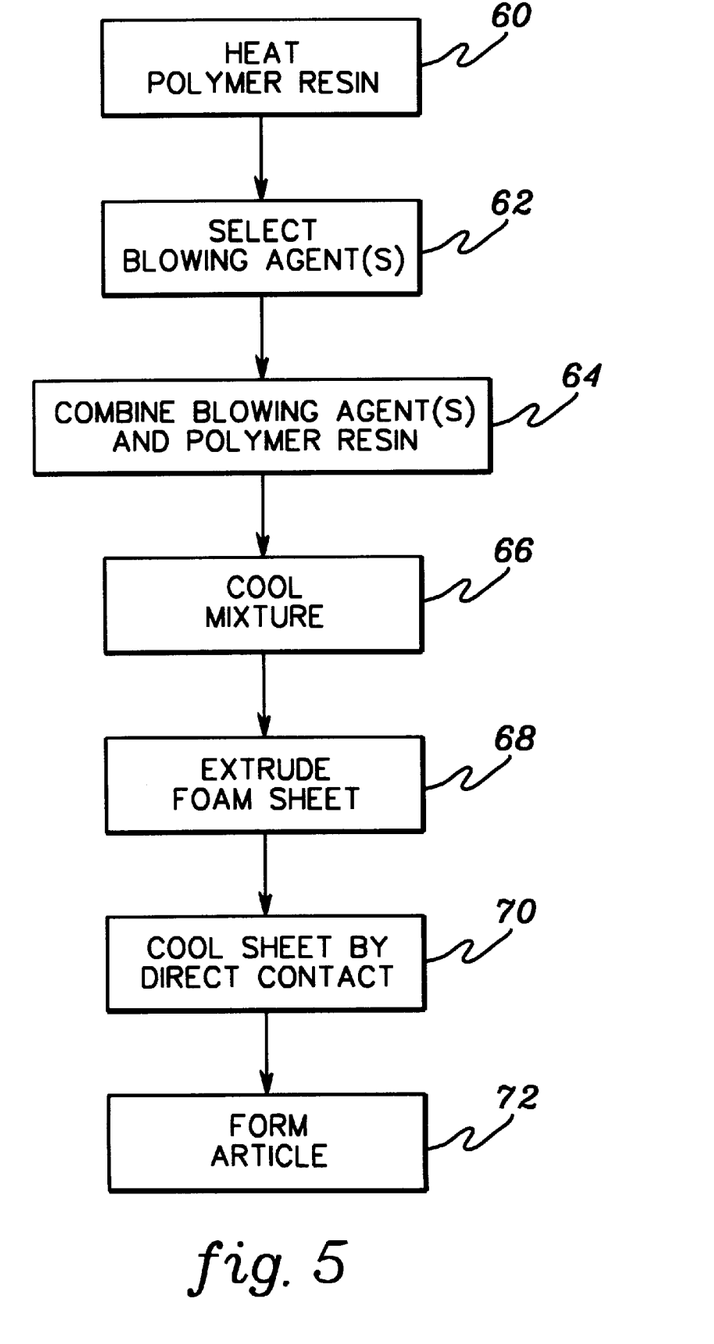
FIG. 5 is a flow diagram for the method of the present invention.

FIG. 5 is a flow diagram for the steps of the basic method. A crystalline polymer resin, such as, for example, polyester resins such as, for example, PET (melting point about 480° F.), syndiotactic polystyrene (melting point about 503° F.), or polyamides, such as, for example, Nylon 6,6 (melting point about 500° F.), is first heated to a temperature such that it melts, which depends on the resin used, but is above its crystalline melt point. Step 60, "HEAT POLYMER RESIN." One or more blowing agents are then selected, at least one of the blowing agents having a boiling point greater than the glass transition temperature for the polymer resin (about 170° F. for PET) and less than the forming temperature, for example, the temperature of a forming mold or tool. (The forming temperature is dependent on the polymer being formed. The forming temperature must be sufficiently high for the solid sheet to crystallize while in contact with the mold surface but yet low enough for the sheet not to melt, warp, or stick to the mold surface.) For PET, the upper limit for the tool temperature appears to be about 400° F. At temperatures greater than about 400° F., the article will either stick to the mold or will be so hot and soft that it will warp after release from the mold. The practical lower limit for the mold temperature is about 300° F., as temperatures lower than this require excessive cycle times to induce crystallinity. Step 62, "SELECT BLOWING AGENT(S)." The blowing agent(s) selected are then combined with the polymer resin to create a mixture. The blowing agent concentration in the mixture is such that a theoretical sheet foam density of less than about 0.4 g/cm$^3$ would be obtained. Step 64, "COMBINE BLOWING AGENT(S) AND POLYMER RESIN." The theoretical density is calculated using the ideal gas law with the assumption that the solubility of the blowing agent in the polymer at room temperature is minimal and the internal gas pressure in the foam approaches one atmosphere.

The mixture is then cooled to a temperature approaching the freezing temperature of the polymer-blowing agent mixture to maximize polymer melt strength during the actual foaming of the mixture. The blowing agent can act as a plastisizer, depressing the melting point of the polymer. This temperature is therefore dependent on both the polymer and blowing agent(s) selected, and can be predicted using Flory-Huggins equations or determined experimentally. Typically, the term "approaching" used above will refer to a temperature within about 20° F. of the freezing point of the mixture (but not below the freezing point). However, since not all polymers display the same viscoelastic properties with respect to temperature, this temperature range may vary somewhat. For PET, a temperature of less than about 510° F., depending on the blowing agent(s) used, is required. Step 66, "COOL MIXTURE." The cooled mixture is then extruded to produce a substantially uniform closed cell polymer foam sheet of density less than 0.4 g/cm$^3$. Step 68, "EXTRUDE FOAM SHEET." For good quality foam, the blowing agent will preferably stay in solution with the resin at least until entering the die land, and preferably until exiting the die land. Evidence that this has occurred is that a clear halo can be seen at the die exit since the extrudate turns opaque as soon as the bubbles begin to grow.

The extruded polymer foam sheet is then cooled by direct contact with a cooling surface, such as a mandrel or chill roll, at a surface temperature below the glass transition temperature such that the blowing agent(s) condenses and the polymer foam sheet collapses to a density of greater than 0.4 g/cm$^3$. Step 70, "COOL SHEET BY DIRECT CONTACT." Finally, a useful article, such as, for example, a food container, is then formed from the cooled polymer foam sheet by applying heat such that the condensed blowing agent(s) vaporizes and the article crystallizes at a density of less than 0.4 g/cm$^3$. Step 72, "FORM ARTICLE."

The general method described above will now be discussed in detail. For the step of selecting the blowing agent or agents (Step 62), the boiling point for at least one of the blowing agents must be greater than the glass transition temperature so that when the blowing agent(s) condenses to a liquid, the foam sheet is still pliable and can collapse. If the boiling point is below the glass transition temperature, the foam sheet will freeze as a low-density sheet before the blowing agent(s) condenses to a liquid. If this occurs, the sheet is self-insulating and will crystallize. Once crystallized, producing a formed article that does not distort becomes difficult. The boiling point for the at least one of the blowing agents must also be less than the forming temperature so that when the article is formed, the blowing agent(s) will vaporize. Vaporizing the blowing agent(s) re-inflates the cells so that the extruded sheet is once again a low-density material, and crystallizing in the mold "freezes" the form, allowing the low-density of the product to be retained even after the product has cooled and the blowing agent(s) has once again condensed to a liquid form.

Regarding the step of combining the blowing agent(s) and resin (Step 64), the actual blowing agent concentration in the resin will depend on the blowing agent or agents used. The theoretical sheet foam density is calculated based on the ideal gas law (pV=nRT, where p=pressure, V=volume, n=molar concentration and is therefore dependent on the molecular weight of the blowing agent selected, R is a constant and T=temperature). Again, the key assumptions of this calculation are that the residual concentration of blowing agent in the polymer at room temperature is minimal and the internal cell gas pressure of the foam sheet before collapse approaches one atmosphere. In reality, most blowing agents appear to be approximately 85% to 90% efficient. That is, only 85% to 90% of the theoretical reduction in density based on mole fraction of gas added is realized. Although a theoretical sheet foam density of less than 0.4 g/cm$^3$ allows enough gas to expand the foam to create a low-density article, the theoretical density is preferably below 0.3 g/cm$^3$, and most preferably below 0.2 g/cm$^3$. The lower the sheet foam density, the better the strength-to-weight ratio of the material is, typically improving as density is reduced. Because of this, lower density products will usually weigh less and therefore be more economical to produce.

Regarding the first step of cooling (Step 66), a cooling temperature approaching the freezing point for the polymer-blowing agent mixture (less than 510° F. for PET and less than 470° F. for syndiotactic polystrene) was chosen because it has been observed, at least for PET and syndiotactic polystyrene, that the melt strength of the extrudate is sufficient to produce a substantially closed cell foam. It is believed that similar results will be seen for other high melting point crystalline polymers. At greater temperatures, low melt strength allows cell walls to rupture, thereby creating an open cell foam. An open cell foam will not retain the blowing agent and will subsequently not expand in the forming operation to produce a low-density foam.

Regarding the second step of cooling (Step 70), the extruded polymer foam sheet is "freezing" at the glass transition temperature due to the direct contact with the cooling surface. The blowing agent, however, condenses before this temperature is reached. When gas vapor pressure is lost from the foam cells, collapse is observed, which improves heat transfer and allows the sheet to be quenched in an amorphous state. Thus, cooling the extruded polymer foam sheet substantially increases its density and prevents crystallization. For PET, the surface temperature of the cooling surface is less than 170° F., the glass transition temperature of PET, and preferably less than 120° F.

The step of forming an article (Step 72) can be accomplished by, for example, thermoforming. The heat needed to vaporize the condensed blowing agent or agents can be provided, for example, by a mold or an oven. The applied heat causes the blowing agent or agents to boil again, while at the same time softening the polymer foam sheet and allowing it to expand to a lower density sheet again. Boiling the blowing agent expands the foam sheet to a low density, and holding the material at a temperature that optimizes the rate of polymer crystallization allows the article to crystallize and therefore become form stable at a density of less than 0.4 g/cm$^3$.

Instead of trying to produce a low-density polymer foam sheet from which a useful article is made, the present invention increases the density of the foam sheet, but allows the heat from the forming process to decrease the density, producing a low-density article. The second cooling step of the present invention (cooling the extruded polymer foam sheet) ensures that the foam sheet does not crystallize. The effective heat transfer from the extruded polymer foam sheet to the cooling surface allows the sheet to be quenched in an amorphous state, with crystallinity of typically less than 10%, but always less than 15%. This level of crystallinity in the sheet can be formed as previously described to produce a low-density article. An article formed in this way has a crystallinity of more than about 20%, as shown by the example data below, and is structurally sound at elevated use temperatures. It has been observed, at least with PET, that when the sheet has a crystallinity of greater than 20% before forming, some form memory will remain in the article and the article will warp at oven conditions, even though the product crystallinity is such that no warping would be expected. Similar results are expected for other high melting point crystalline polymers.

Figure 1:
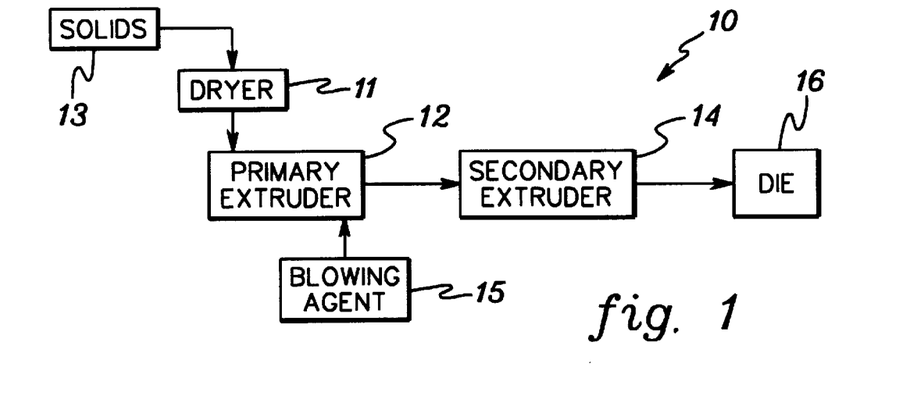
FIG. 1 is a block diagram of the major components of an extrusion system useful with the present invention.
Figure 2:
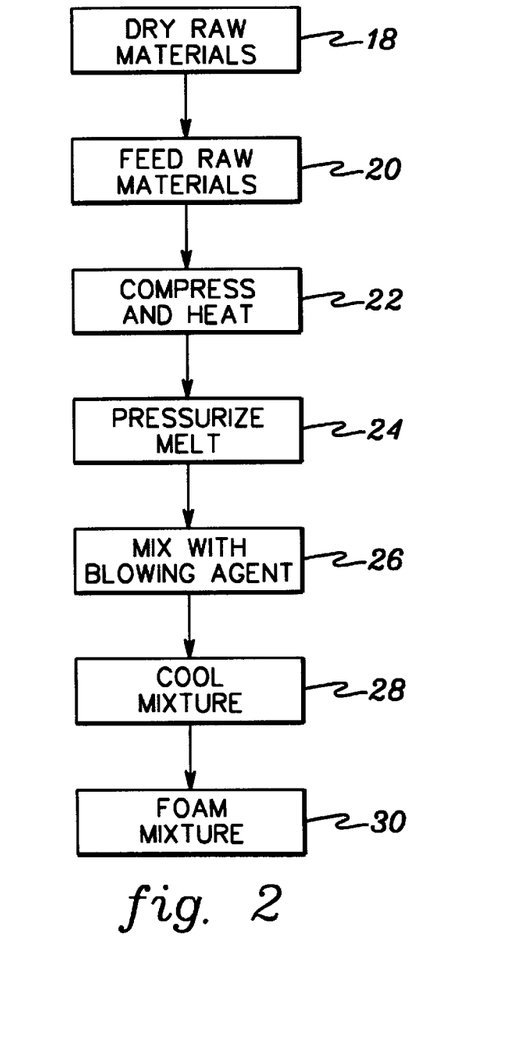
FIG. 2 is a flow diagram for a general extrusion process with reference to the system of FIG. 1.
Figure 3:
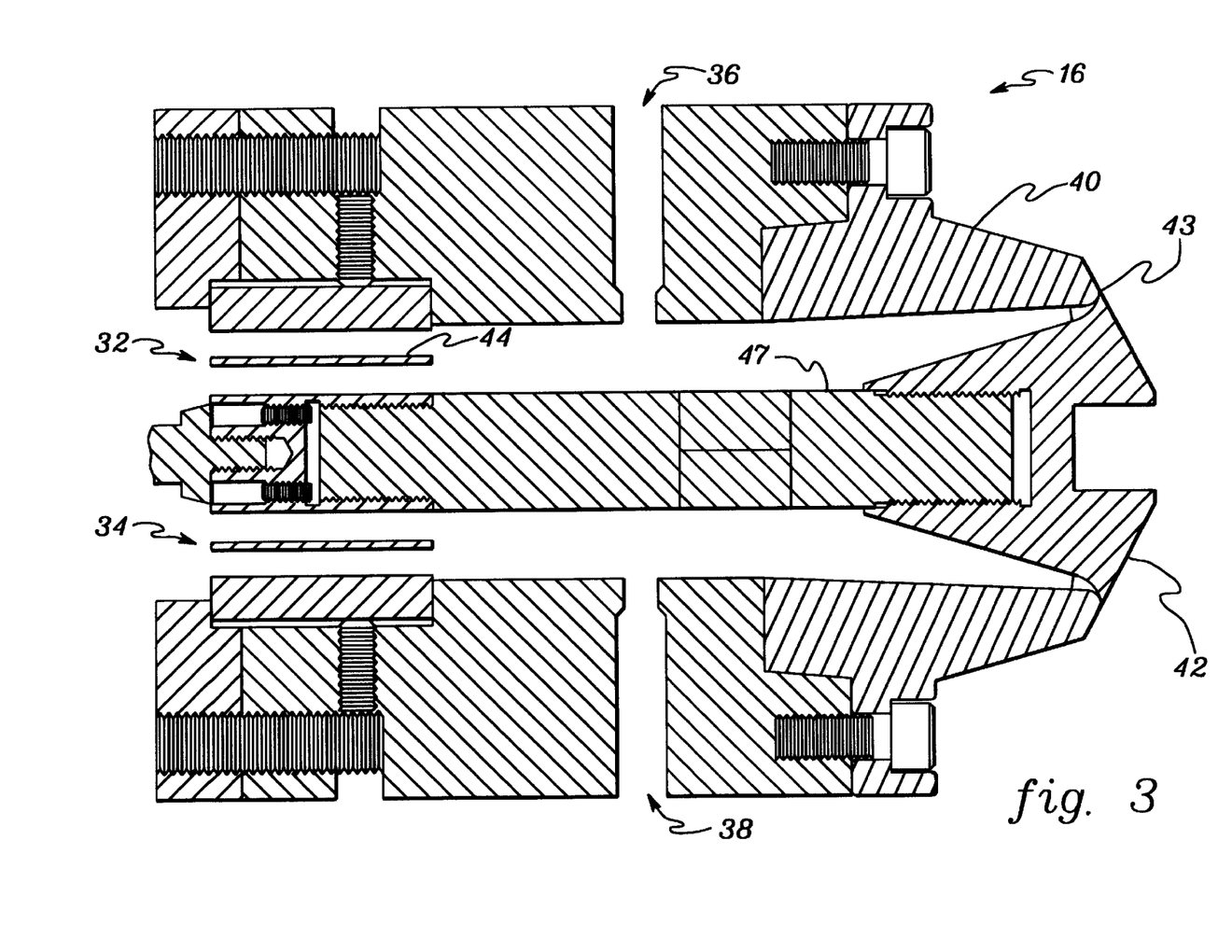
FIG. 3 is a cross-sectional view of the extrusion die of FIG. 1.

With reference to FIGS. 1–3, a general tandem extrusion process will now be described that is useful with the present invention. It will be understood, however, that other extrusion processes exist that could also be used, and this is merely one example given in order to put the invention in context.

FIG. 1 is a block diagram of the major portions 10 of machinery used in a tandem extrusion process. The major portions 10 include a desiccant dryer 11, a primary extruder 12, secondary extruder 14 and a die 16. One of ordinary skill in the art will understand the operation of the major portions. Polyesters, for example, are hydroscopic and must be dried to a dew point of –20° F. or less, as they undergo severe degradation in the melt phase in the presence of water. The first step is therefore, for polyesters or other hydroscopic polymers, to dry the raw materials using the desiccant dryer 11. Other materials, such as, for example, syndiotactic polystyrene, are not hydroscopic and do not need to be dried. Generally, heating of the solids 13 to be extruded (a polymer) and mixing with the blowing agent 15 are accomplished in primary extruder 12. Cooling of the mixture is performed in secondary extruder 14. Finally, the cooled mixture is fed to die 16 for foaming.

FIG. 2 is a flow diagram for the extrusion process of FIG. 1. The raw materials, if hydroscopic, are first dried to a dew point of –20° F. or less, and preferably to a dew point of less than –40° F. (Step 18, "DRY RAW MATERIALS"). The raw materials are then fed to primary extruder 12 (STEP 20, "FEED RAW MATERIALS"). The raw materials will generally comprise a mixture of virgin polymer, reclaim polymer generated in manufacturing, colorants, stabilizers, nucleators, flame retardants, plastisizers, tougheners, and possibly other additives. Although ratios of the additives may vary greatly, generally the virgin polymer and reclaim polymer constitute about 90% or more of the solid feed by weight. The raw materials may be fed to primary extruder 12 by volumetric or gravimetric feeders and may or may not use a blender to homogenize the mixture before being fed. Often, the primary extruder is flood fed; that is, there is a constant supply of raw material directly on the extruder inlet or feed throat, although other types of feeding are practiced.

After the raw materials are fed to primary extruder 12, they are compressed and heated to melt them (STEP 22, "COMPRESS AND HEAT"). After melting the raw materials, the melt is pressurized (STEP 24, "PRESSURIZE MELT"). Typical pressures range from about 150 atm to about 350 atm. After pressurizing the melt, a blowing agent or agents (e.g., hydrocarbons, halohydrocarbons, and/or inert gases) is injected into primary extruder 12. The pressure may temporarily be reduced to aid in the injection. The melted raw materials and blowing agent are then mixed to create a homogeneous mixture prior to exiting primary extruder 12 (STEP 26, "MIX WITH BLOWING AGENT"). The mixing could be, for example, distributive or dispersive, whichever method best suits the blowing agent/polymer system selected.

After injecting the blowing agent and combining with the melted raw materials, the mixture is generally too hot to foam. When the mixture is too hot, viscosity is low, and if foaming were attempted, the blowing agent would expand the cells within the foam too rapidly, leading to cell wall rupture and foam collapse. If, on the other hand, the mixture were too cold, the blowing agent would have insufficient potential energy to expand the mixture into a foam. In addition, there is a process danger that the mixture may freeze within the process, which is especially possible with crystalline polymers. Precise control of the foaming temperature is thus needed to ensure good quality foam.

Cooling of the mixture is accomplished in secondary extruder 14 (STEP 28, "COOL MIXTURE"). The secondary extruder is usually larger than the primary extruder to maximize the amount of surface area for heat transfer. Shear heating of the mixture is minimized through various designs for the secondary extruder screw, which provides continuous surface renewal to the barrel. Without this renewal, the mixture at the surface of the extruder barrel would freeze and insulate the rest of the mass, which would pass through the secondary extruder without being cooled. Usually, the extruder screw in the secondary extruder operates at a much lower rotational speed than that of the primary extruder, to reduce shear heating. The particular screw design used may affect the pressure of the mixture.

The cooled mixture is then delivered to die 16 for foaming (STEP 30, "FOAM MIXTURE"). The principle purpose of the die is to shape the polymer into a form, while maintaining the pressure to ensure that the blowing agent does not separate from the mixture prematurely. Ideally, the blowing agent remains in the mixture until exiting the die. The design of the die determines the width and thickness of the extruded foam. The combination of take-away speed of the sheet and throughput determine the basis weight of the sheet produced (g/ft$^2$).

Figure 4:
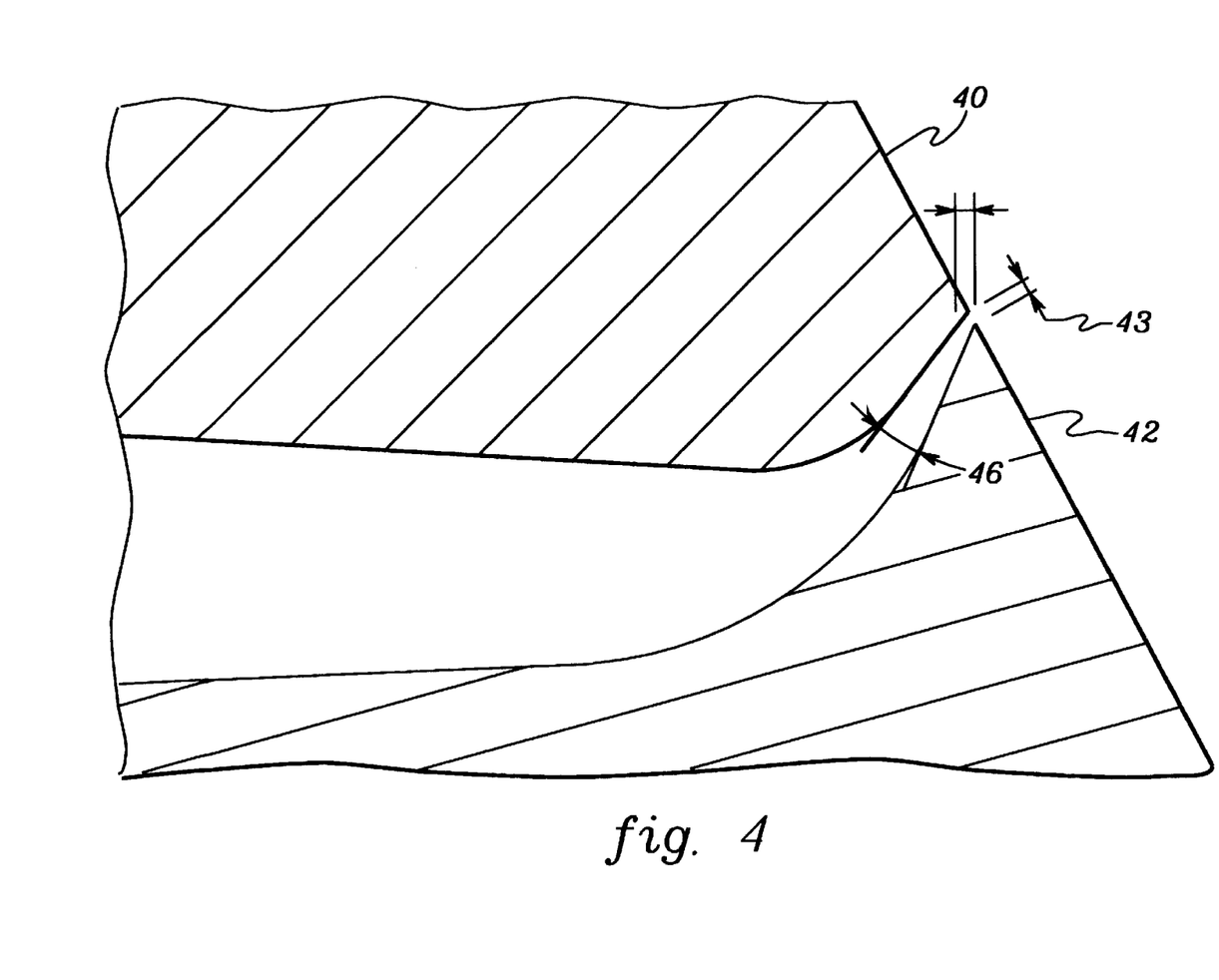
FIG. 4 depicts an enlarged portion of the die of FIG. 3.

FIG. 3 is a cross-sectional view of an exemplary embodiment of die 16. The cooled mixture enters die 16 through openings 32 and 34. The temperature and pressure of the mixture while inside the body of die 16 are monitored by instrumentation (not shown) connected at taps 36 and 38. The female die lip 40 and male die lip 42 define a die gap 43 (shown more clearly in FIG. 4). Spider or breaker plate section 44 holds male die lip 42 in place. Ideally, foaming takes place upon the polymer mixture exiting through die gap 43 and the blowing agent then vaporizing. However, foaming may begin in the land area 46 (called "prefoaming"). When prefoaming occurs, the result often is a less desirable surface finish and an irregular cell structure. To affect die pressure, the die gap may be increased or decreased through various mechanisms. One example of such a mechanism is screw 47 in FIG. 3.

Figure 6:
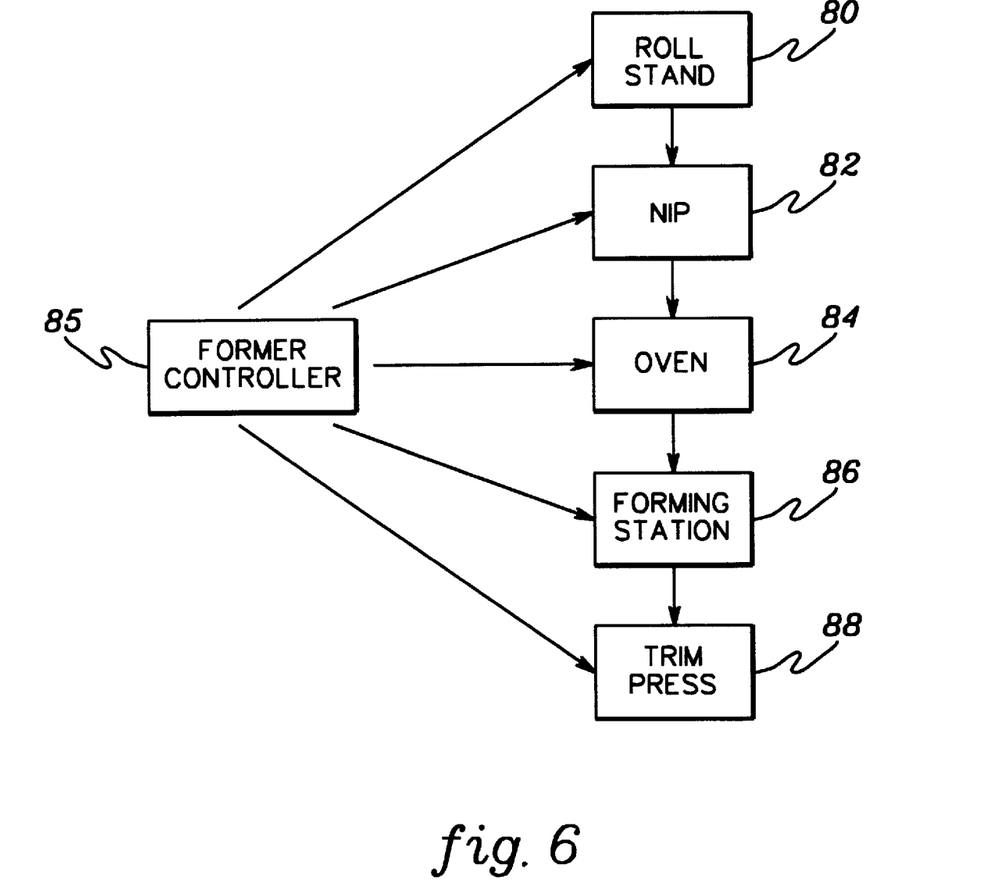
FIG. 6 is a block diagram of an exemplary thermoformer useful with the present invention.

With reference to FIG. 6, an exemplary thermoformer apparatus useful with the present invention will now be described. A roll of foam sheet is placed on an unwind or roll stand 80 and is fed to the former oven 84 by a nip 82. The nip drives the foam roll and consists of two rubber rollers with hydraulic cylinders that move the rolls apart and together such as to form a nip point. When the former controller 85 calls for sheet, the nips are brought together and the sheet is thus fed to the oven on an as-needed basis. Former controller 85 is programmed to control the thermoforming process.

The sheet enters the oven 84 on two chain rails mounted on either side of the oven. The rails index the sheet through the oven to the forming station 86. The sheet is heated in the oven by heater elements. Various types of elements are used in such processes, but calrod-type heaters are preferably used with the present invention. In the oven, the temperature is controlled such that the sheet is heated to approximately the glass transition temperature of the polymer foam. If the sheet is much colder than this, it may not draw uniformly in the forming station and "cold cracks" could appear in the product. If, however, the temperature of the sheet is much in excess of the glass transition temperature, then the sheet may begin to crystallize before forming, yielding an undesirable memory to the part; that is, the formed part will to some extent deform during its intended use by trying to revert to a flat sheet.

Figure 7:
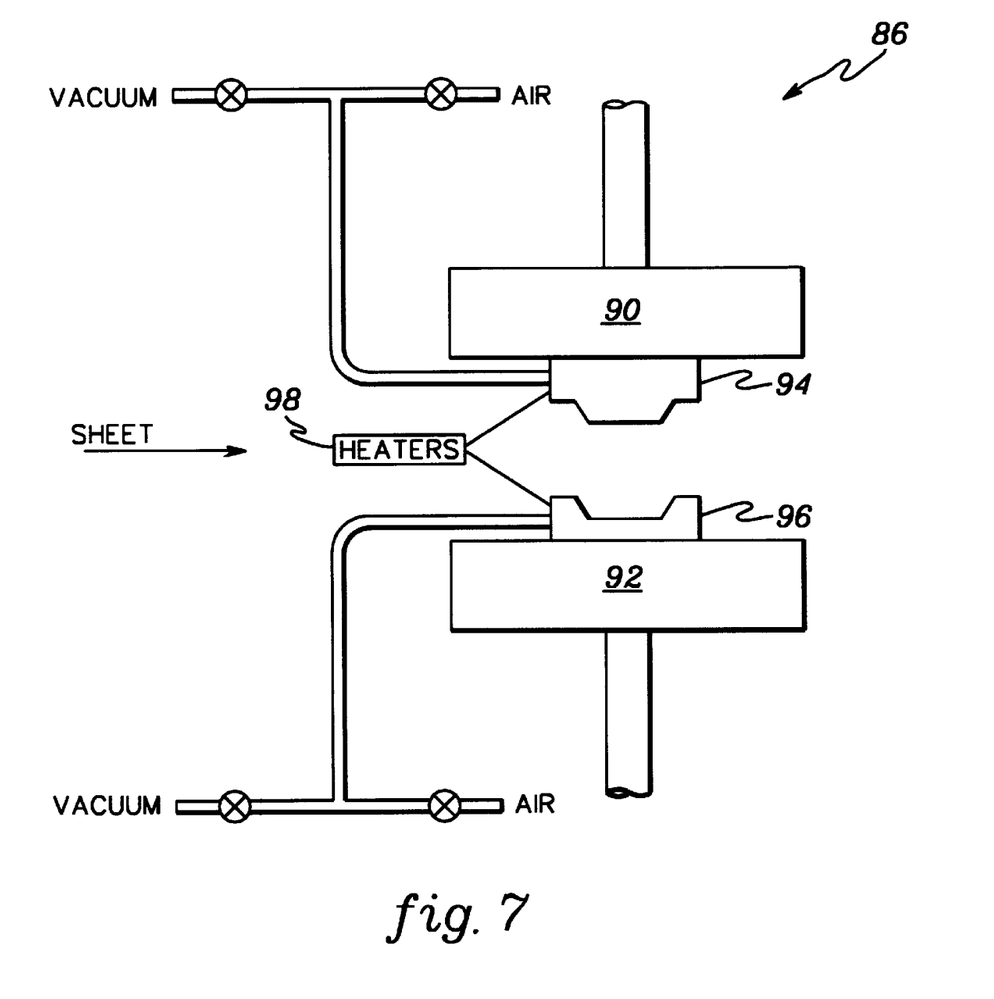
FIG. 7 depicts the forming station of FIG. 6 in more detail.

Once properly tempered, the sheet enters the forming station 86. FIG. 7 is a more detailed drawing of such a station. After the chain rails index the sheet into position, the platens 90 and 92 close, bringing the mold halves 94 and 96 together. It may in some instances be advantageous to close one platen slightly sooner than the other, or to use differential closing speeds, in order to more uniformly draw the sheet into the form of the mold. The mold consists of a male half 94 and female half 96. These types of molds, also known as "matched tooling", are in essence identical, except that the male half is machined at an offset to the female half, creating a gap. This gap is the cavity where the sheet is formed. The platen spacing is adjusted to yield the desired part thickness as determined by this gap. For polyester, the mold is heated by heater elements 98 to a crystallizing temperature of about 360° F. A form time or mold contact time of about 4 to 6 seconds is generally sufficient for PET to induce crystallinity of greater than about 20%. To assist the forming of the part and to induce greater heat transfer, a vacuum is applied to the mold just after closure to help draw the material to both surfaces. Just as the mold is opening, a slight amount of air is then applied both to relieve the vacuum and help push the formed part out of the mold without sticking. The formed part, still attached as part of the sheet, is then indexed out of the forming station.

The formed part then enters trim press 88. A die is used to cut the part out of the sheet. The formed parts, once cut, are collected for packaging. The "skeleton" or portion of the sheet remaining after the parts have been removed is then ground into flakes and air conveyed to a silo where it is collected for reprocessing. Typically, a trim press will have adjustments for registration; that is, adjustments can be made to make certain that the trim about the perimeter of the formed part is uniform.

Although the example data given below is for polyester, the results are expected to be similar for other high melting point crystalline polymers, such as, for example, syndiotactic polystyrene and Nylon 6,6.

EXAMPLE 1

Operating conditions for the manufacture of polyester sheet foam are listed below in Table 1. As can be seen in the results, the extrudate immediately upon leaving the die formed a low-density foam with a density of approximately 0.20 g/cm$^3$, but within a matter of several seconds of contact time with the cooling mandrel collapsed to a density of approximately 0.49 g/cm$^3$. During forming, however, the blowing agent was again heated to above its boiling point, resulting in a low-density foam. The action of crystallizing "freezes" the part in a low-density geometry. In this case, a cake pan of 8 inches in diameter was formed with an average density of about 0.19 g/cm$^3$. Upon cooling, this crystallized cake pan did not subsequently collapse or distort.

As a result of the foam collapse, the measured crystallinity of the foam sheet was only about 8%. During forming, the crystallinity was increased to about 32%. The resultant cake pan was dimensionally stable in an oven environment and performed its intended function (baking a cake) well.

TABLE I

| Temperatures | |
| --- | --- |
| 2.5" Cooling Extruder | 480° C. |
| Die Temperature | 494° C. |
| Die Lip | 501° C. |
| Crossover Melt | 562° C. |
| Die Melt (estimated) | 490° C. |
| Pressures | |
| Injection Pressure | 156 atm |
| 2" Pressure | 320 atm |
| Gear Pump Inlet Pressure | 110 atm |
| Crossover Pressure | 250 atm |
| Die Pressure | 73 atm |
| Drive Conditions | |
| 2" AMP | 30 amps |
| 2" Speed | 127 rpm |
| Gear Pump AMP | 2.6 amps |
| Gear Pump Speed | 40 rpm |
| 2.5" AMP | 10 amps |
| 2.5" Speed | 32.1 rpm |
| Formulation | |
| Polymer Type | Shell 2928 |
| Polymer Rate | 136 lb/hr |
| Nucleator Type | Shell 10480 |
| Nucleator Rate | 2.3 lb/hr |
| Blowing Agent Type | n-Heptane |
| Blowing Agent Rate | 2.4 lb/hr |
| Test Data | |
| Thickness (exiting die) | 85 mils |
| Thickness (final) | 35 mils |
| Basis Weight | 40.8 g/ft$^2$ |
| Density (exiting die) | 0.20 g/cm$^3$ |
| Sheet Density | 0.49 g/cm$^3$ |
| Formed Part Density (average) | 0.19 g/cm$^3$ |
| Sheet Crystallinity | 8% |
| Part Crystallinity | 32% |

EXAMPLE 2

Operating conditions for the manufacture of polyester sheet foam are listed below in Table 2. As can be seen in the results, a low-density foam sheet was formed with a density of approximately 0.27 g/cm³. A slight collapse may have occurred during the cooling process, but the density of the sheet exiting the die is essentially the final density of the foam. During forming, the foam expanded in a traditional sense, due to air infiltration, the sheet expansion being on the order of about 50% to 100% of the original thickness. The expansion resulted in a final part with a thickness of about 86 mils and an average density of about 0.15 g/cm³. Again, a cake pan of 8 inches in diameter was formed. In this case, however, the part definition was poor and considerable dimensional distortion was measured in the finished part.

As the measured crystallinity of the foam sheet was about 28%, forming only increased the crystallinity to about 32%. It appears that the part retains a memory of its geometry when it originally crystallized. The resultant part was not dimensionally stable in an oven environment. The part flattened during oven testing and bake testing was therefore a complete failure.

TABLE II

| | |
|---|---|
| Temperatures | |
| 2.5" Cooling Extruder (Average) | 490° C. |
| Die Temperature | 550° C. |
| Die Lip | 496° C. |
| Crossover Melt | 500° C. |
| Die Melt (estimated) | 500° C. |
| Pressures | |
| Injection Pressure | 150 atm |
| 2" Pressure | 239 atm |
| Gear Pump Inlet Pressure | 111 atm |
| Crossover Pressure | 225 atm |
| Die Pressure | 43 atm |
| Drive Conditions | |
| 2" AMP | 26 amps |
| 2" Speed | 131 rpm |
| Gear Pump AMP | 2 amps |
| Gear Pump Speed | 40 rpm |
| 2.5" AMP | 10 amps |
| 2.5" Speed | 31.7 rpm |
| Formulation | |
| Polymer Type | Shell 2928 |
| Polymer Rate | 124 lb/hr |
| Nucleator Type | Shell 10480 |
| Nucleator Rate | 3.0 lb/hr |
| Blowing Agent Type | C-pentane |
| Blowing Agent Rate | 2.6 lb/hr |
| Test Data | |
| Thickness (final) | 55 mils |
| Basis Weight | 36.2 g/ft² |
| Sheet Density | 0.27 g/cm³ |
| Formed Part Density (average) | 0.15 g/cm³ |
| Sheet Crystallinity | 28% |
| Part Crystallinity | 32% |

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. A method of forming a substantially uniform closed cell crystalline polymer foam article, comprising steps of:
   heating a crystalline polymer resin to a melt temperature such that the resin melts;
   selecting one or more blowing agents, at least one of the one or more blowing agents having a boiling point greater than a glass transition temperature for the resin and less than or equal to a forming temperature;
   combining the one or more blowing agents with the resin to create a mixture such that a concentration of the one or more blowing agents in the mixture is sufficient to produce a theoretical sheet foam density of less than 0.4 g/cm³;
   cooling the mixture to a temperature approaching a freezing temperature for the mixture;
   extruding a substantially uniform closed cell polymer foam sheet of density less than 0.4 g/cm³ from the cooled mixture;
   cooling the extruded polymer foam sheet by direct contact with a cooling surface at a surface temperature below the glass transition temperature such that the one or more blowing agents condense and the polymer foam sheet has a density of greater than 0.4 g/cm³; and
   forming the cooled polymer foam sheet into an article, comprising applying heat such that the condensed one or more blowing agents vaporize and the article crystallizes at a density of less than 0.4 g/cm³.

2. The method of claim 1, wherein the crystalline polymer resin comprises a syndiotactic polystyrene resin.

3. The method of claim 1, wherein the crystalline polymer resin comprises a polyester resin.

4. The method of claim 3, wherein the polyester resin comprises poly(ethylene terephthalate).

5. The method of claim 4, wherein the melt temperature is above about 480° F., wherein the glass transition temperature is about 170° F., and wherein the forming temperature is about 350° F.

6. The method of claim 4, wherein the step of forming comprises thermoforming with a heated mold at a mold temperature of between about 300° F. and about 400° F.

7. The method of claim 6, wherein the mold temperature is between about 350° F. and about 375° F., and wherein the step of forming further comprises allowing mold contact time such that the article formed has a crystallinity of greater than about 20%.

8. The method of claim 1, wherein the surface temperature of the cooling surface contacting the extruded sheet is below about 120° F.

9. The method of claim 1, wherein the step of cooling the extruded polymer foam sheet comprises cooling with a mandrel.

10. The method of claim 1, wherein the step of cooling the extruded polymer foam sheet comprises cooling with a chill roll.

11. The method of claim 1, wherein the at least one of the one or more blowing agents comprises heptane.

12. The method of claim 11, wherein the concentration of heptane in the mixture is greater than about 1.2% by weight.

13. The method of claim 12, wherein the concentration of heptane in the mixture is greater than about 1.6% by weight.

14. The method of claim 1, wherein the extruded polymer foam sheet has a crystallinity of less than 15%.

15. The method of claim 14, wherein the extruded polymer foam sheet has a crystallinity of less than 10%.

16. The method of claim 1, wherein the formed article has a crystallinity of more than 20%.

17. The method of claim 1, wherein the polymer resin comprises one or more additives.

18. The method of claim 17, wherein the one or more additives comprise one or more of a cell size nucleation agent, a crystallinity nucleation agent, a toughener, a flame retardant, a colorant and a plastisizer.

* * * * *